Nov. 16, 1954     A. W. SHARP     2,694,220
HEAD HOLDING MEANS FOR A FOWL PICKING APPARATUS
Original Filed June 4, 1947     4 Sheets-Sheet 1

Inventor:
Allen Sharp,
By Bair, Freeman & Molinare
Att'ys.

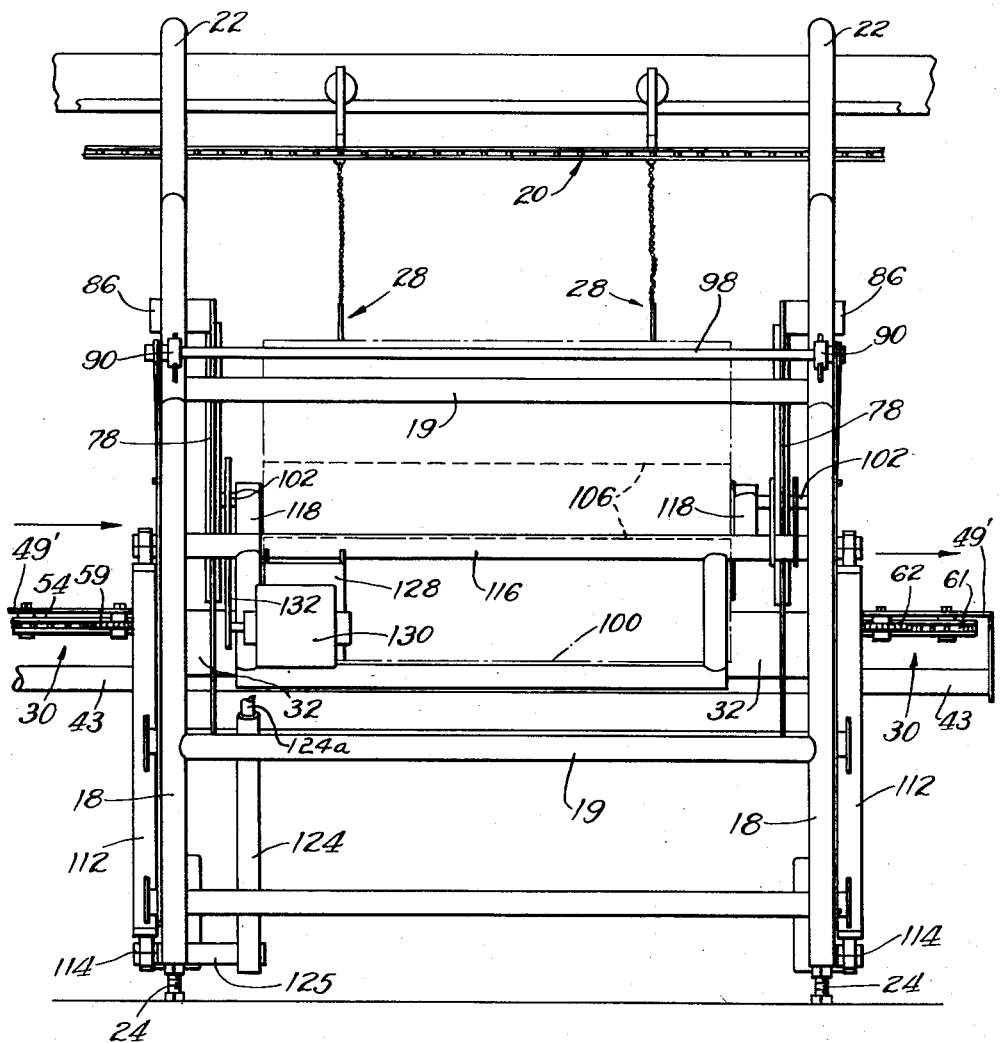

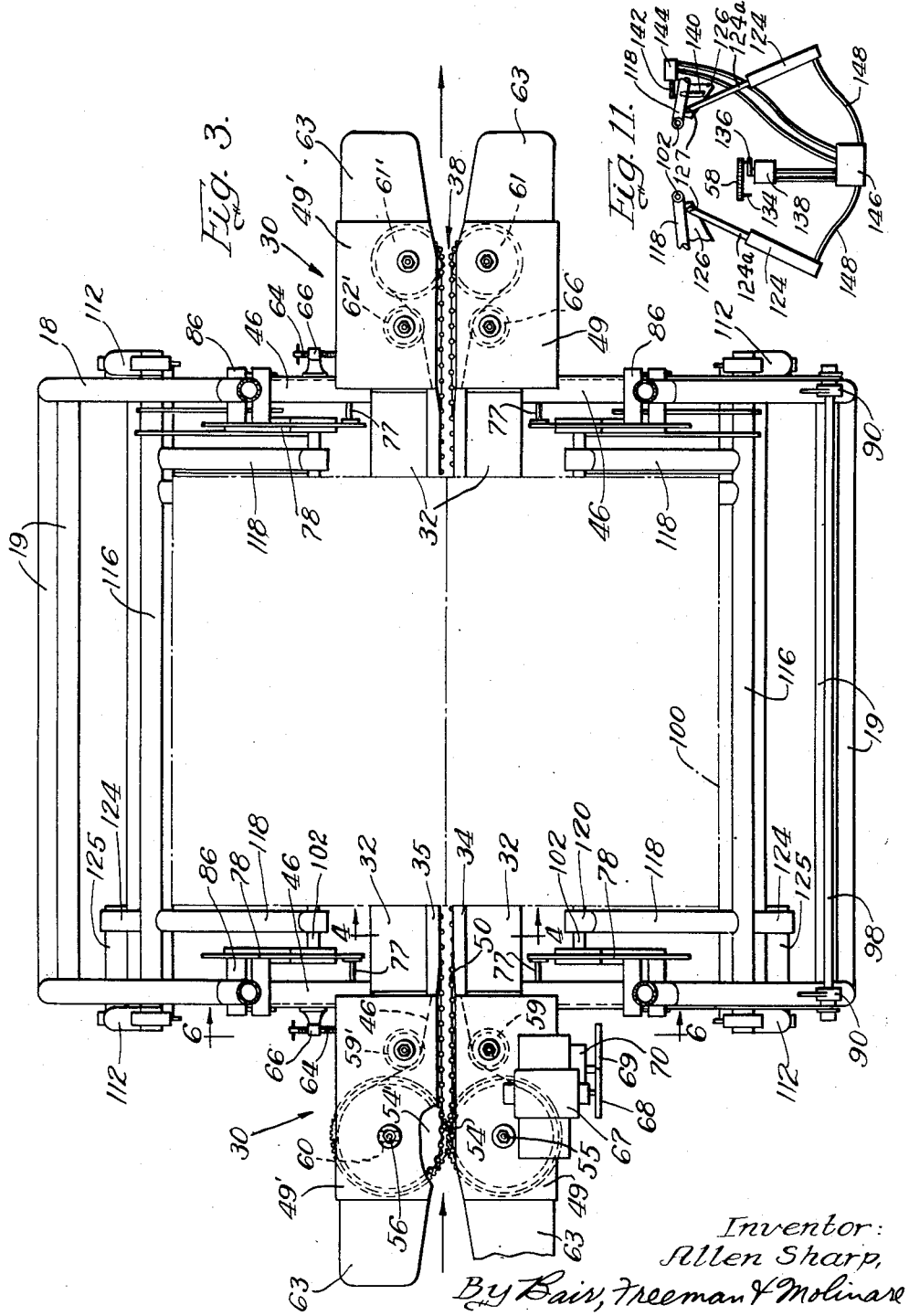

Nov. 16, 1954 A. W. SHARP 2,694,220
HEAD HOLDING MEANS FOR A FOWL PICKING APPARATUS
Original Filed June 4, 1947 4 Sheets-Sheet 4
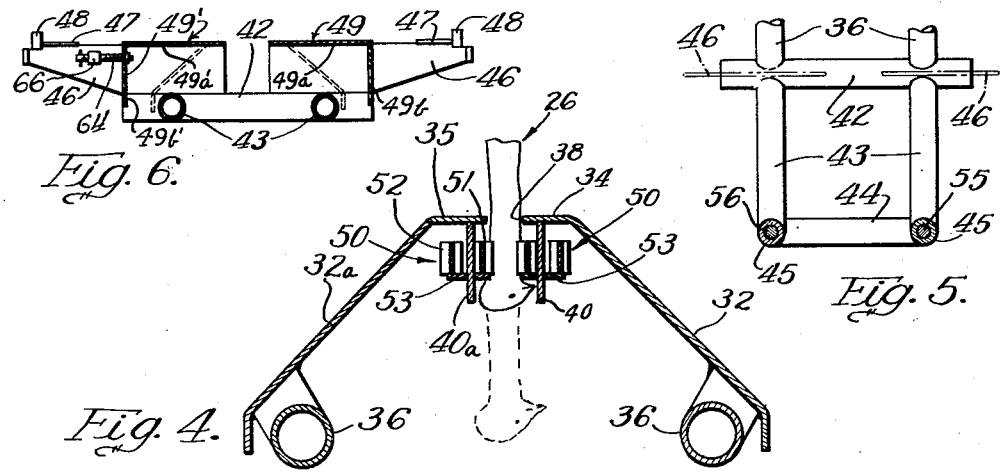
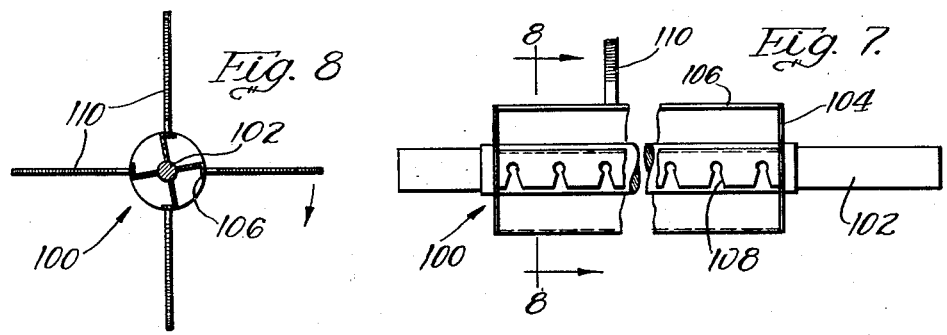
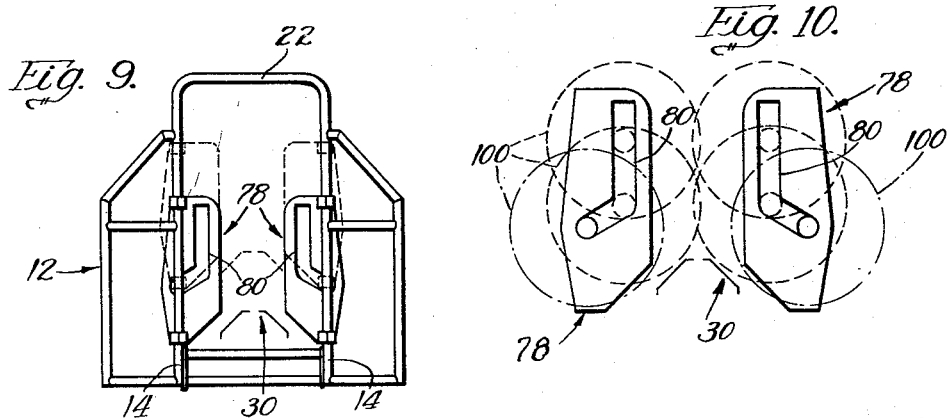
Inventor:
Allen Sharp,
By Bair, Freeman & Molinare
Attys.

United States Patent Office 2,694,220
Patented Nov. 16, 1954

2,694,220

HEAD HOLDING MEANS FOR A FOWL PICKING APPARATUS

Allen W. Sharp, Ottumwa, Iowa, assignor to Barker Poultry Equipment Company, Ottumwa, Iowa, a corporation of Iowa Original application June 4, 1947, Serial No. 752,314. Divided and this application December 26, 1951, Serial No. 263,279

14 Claims. (Cl. 17—11.1)

This invention relates to chicken pickers.

This application is a divisional application of my copending application Serial No. 752,314, filed June 4, 1947, and now issued as Patent No. 2,603,831. This application is also related to another divisional application of said copending application bearing Serial No. 89,209, filed April 23, 1949, and now issued as Patent No. 2,596,443.

A serious objection to previous chicken picking machines is that it was practically impossible to pick all of the feathers from the fowls. It was formerly customary to suspend fowls on a moving overhead conveyor, and at a point along the line of travel a picker operated on the fowls, sweeping downwardly thereover. There were certain parts of the fowls which were not completely picked, such as the back of the wings, back, etc. Such parts of the fowls were not in position where the picking mechanism could strike the feathers.

It was then customary to finish the picking process by hand operation. The picking operation could be carried further by mechanical means by reversing the fowls on the conveyor, and subjecting them again to a picker. Such reversal of the fowls involved the expensive hand operation of reversing the fowls.

I conceived the idea that, instead of reversing the fowls on the conveyor for a second operation, the picking operation could be reversed, resulting in greater efficiency and economy. Various difficulties were of course encountered, the chief one being that if the picking mechanism swept upwardly over the fowls suspended from an overhead conveyor, the fowls would be carried upwardly and dangle above the picking mechanism.

I next conceived the idea of holding the heads of the fowls down for the up-sweeping picking operation. My invention lies in an apparatus for carrying these operations into effect.

It is, therefore, an object of the present invention to provide means for holding the heads of the fowls down, so that picking mechanism could sweep upwardly over the fowls. The means for holding the heads down is arranged so that the fowls in traveling along the conveyor pass therethrough without any manual manipulation.

The present invention is designed to be used in conjunction with a conventional chicken picker which sweeps downwardly over the fowls, and the two devices together completely pick the fowls.

An additional object of the invention is the inclusion of means for adjusting the head-holding means to accommodate all sizes of fowls.

A further object of the invention is provision of an arrangement whereby a wide range of sizes of fowls can be accommodated in each setting of the head-holding means.

Another object of this invention is to provide a chicken picking machine with a head-holding and conveying attachment, wherein the head-holding attachment automatically and loosely seizes the neck of the chicken for conveyance thereof, whereby the neck and head of the chicken hangs vertically downward.

Still a further object of this invention is to provide a head-holding attachment for a chicken picking machine, which head-holding attachment loosely surrounds the neck of the fowl and conveys the neck of the fowl along a predetermined path, and which includes means for limiting longitudinal motion of the neck of the fowl along said predetermined path, whereby the neck and head of the fowl hang vertically downward.

And still an additional object of this invention is to provide a head-holding attachment, which head-holding attachment loosely surrounds the neck of the fowl and conveys the neck of the fowl along a predetermined path, and which includes means for limiting longitudinal motion of the neck of the fowl along said predetermined path, whereby the neck and head of the fowl hang vertically downward.

With these and other objects in view, this invention consists in the construction, arrangement and combination of the various parts of the device whereby the objects contemplated are attained, as hereinafter more fully set forth, pointed out in my claims, and illustrated in the accompanying drawings, wherein:

Figure 2 is a side view, as viewed from the right of Figure 1;

Figure 3 is a top plan view partly in cross section and is taken looking downward from above just below the upper suspending conveyor, with the picking drums shown in outline only;

Figure 4 is an enlarged sectional view taken on line 4—4 of Figure 3;

Figure 5 is a partial view taken on line 5—5 of Figure 1;

Figure 6 is a view partly in cross section, of the hood portion of the machine adjacent the head-holding and conveying means, and is taken substantially on line 6—6 of Figure 3;

Figure 7 is an enlarged detail view of the center portion of one of the chicken picking drums showing details of the picking finger mounting means;

Figure 8 is a view, on a reduced scale, taken on line 8—8 of Figure 7;

Figure 9 is a reduced diagrammatic illustration showing the different positions of adjustment of the head-holding means;

Figure 10 is a diagrammatic view showing various positions of the chicken picking drums; and Figure 11 is a diagrammatic view illustrating the hydraulic control mechanism for operating the chicken picking means.

Figure 1:
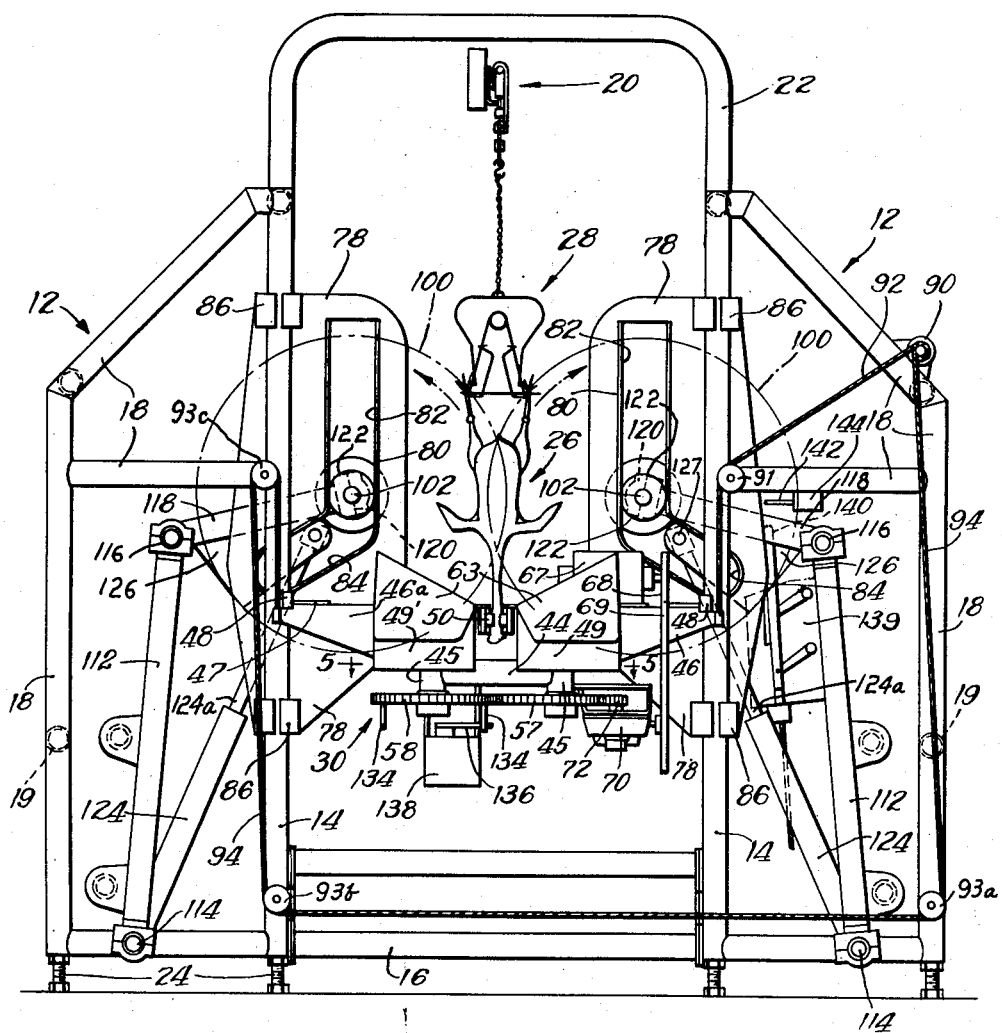
Figure 1 is an end view of the machine of the present invention.

Referring now in detail to the drawings, the device includes a main frame 12 having an end unit at each end of the machine, each end unit comprising inner upright members 14, horizontal members 16, and other reinforcing and strengthening members 18. The two end units are interconnected by longitudinal members 19. The mechanism is to be used in connection with a conveyor indicated generally at 20 from which fowls are suspended. The conveyor is provided with customary driving means (not shown), and travels longitudinally through the machine from left to right as illustrated in Figure 2. The frame end units are secured together at the top by means of yokes 22, one at each end of the frame, which are removably secured in the upper ends of the respective upright members 14. The yokes 22 are placed in position after adjusting the machine with relation to the conveyor 20, since the conveyor may be designed for other machinery. The apparatus may be supported on adjustable legs 24 to compensate for unevenness in the supporting floor.

A fowl is indicated at 26 in Figure 1, supported by a shackle 28 which may be of any convenient type. Shackles 28 are spaced at convenient intervals along the conveyor, as indicated in Figure 2.

The fowl 26 is shown suspended by the feet with the head down, as is customary in chicken picking operations. As explained above, previous chicken pickers swept downwardly over the fowls and in order to sweep upwardly it is necessary to secure their heads and retain them from rising upwardly. To this end a head-holding means is provided for engaging the heads of the fowls and retaining them down.

The head holding means is indicated as a whole at 30, and includes a pair of longitudinal members or shields 32 and 32a, having inturned flat portions 34 and 35 (Figure 4). The flat portion 34 may be secured to the respective shield 32, but the portion 35 is separate from its shield 32a for adjustment purposes, as will be pointed out later. The shields 32 and 32a form an inverted trough, that is, their sides are inclined outwardly and downwardly, and are supported by longitudinal reinforcing tubular members 36. The shields 32 and 32a are spaced apart so that the parallel upper flat members or portions 34 and 35 form a longitudinal open channel 38, and depending from the under surfaces of the flat portions 34 and 35 are parallel backing plates 40 and 40a which extend downwardly a short distance and reach longitudinally substantially the full length of the head-holding means. It will be noted that the head-holding means 30 extends entirely through the machine.

The shields 32 are supported in relative positions, and the head-holder frame rendered unitary, by cross pieces 42 at each end to which the tubular members 36 are secured (Figures 5 and 6). Extending longitudinally beyond the tubular members 36 at each end of the head-holder frame are additional members 43 to the ends of which are secured cross pieces 44 (shown best in Figures 1 and 5). At the entering end of the machine (the left of Figure 3) vertical bearing members 45 are interposed at the juncture between the members 43 and the cross pieces 44, but at the exit end (the right of Figure 3), the bearing members 45 may be omitted.

Secured to each cross piece 42, as by welding, are a pair of plates 46 and 46a spaced apart relative to each other, and extending upwardly and outwardly from the cross pieces.

The upper portions of the plates 46 and 46a are turned over horizontally, and secured to the outer extremities of the upper flat portions of the plates 46 and 46a are brackets 47 and 47a, respectively, which in turn support collar elements 48. The collar elements 48 are adapted to slidingly engage the upright members 14 of the main frame 12 for vertical adjustment of the head-holder frame 30.

Hoods 49 and 49' are secured respectively to the ends of the flat portions 34 and 35 of the shields 32 and 32a. The hoods 49 and 49' at each end of the head-holding frame are spaced apart from each other, similarly to the plates 46, and have portions 49a and 49a' extending horizontally, and portions 49b and 49b' extending downwardly.

A pair of chains 50 are arranged in the head-holding means below the flat portions 34 and 35 of the shields 32 so that each chain has a run 51 on the inside of the respective backing plate 40 extending parallel to the run 51 on the other chain, and a run 52 on the outside thereof. The inner spaced parallel edges of members 34 and 35 which bound open channel 38, and the spaced parallel runs 51 of chains 50 serve as vertically extending parallel members which define and bound a vertical passageway through which the neck of the fowl hangs, and along the length of which the neck of the fowl passes, as the fowl is conveyed through the machine by the overhead conveyor 20. The chains 50 may be conventional sprocket chains. If desired, horizontal supporting ledges such as 53 may be provided for supporting the chains 50 upwardly.

A pair of driving sprockets 54 and 54' are supported respectively by shafts 55 and 56 in the vertical bearing members 45 at the entering end of the head-holder 30, one sprocket being on each side of the open channel 38, over which respective chains 50 are trained. The sprockets 54 and 54' are operated by meshing gears 57 and 58 secured respectively to the lower ends of the shafts 55 and 56 below the respective cross piece 44. The cross pieces 44 are disposed a considerable distance below the flat portions 34 and 35 of the shields 32 to provide space for the heads of the fowls, as will be explained more fully later. Idler sprockets 59 and 59', respectively, are provided adjacent the driving sprockets 54 and 54' to guide the outer runs 52 around the driving sprockets 54 and 54'. The idler sprockets 59 and 59' may be journalled in the horizontal portions of the hoods 49 and 49'; the hoods 49 and 49' may have bearing support on the upper ends of the shafts 55 and 56, if desired; a slot 60 is provided in the hood 49' to accommodate the shaft 56.

The opposite or exit end of the head holder 30, shown at the right of Figure 3, is provided with cooperating sprockets 61 and 61' and corresponding idler sprockets 62 and 62', both of which may be supported by the respective hoods 49 and 49'. Additional shields 63 and 63' may be provided at the ends of all of the hoods 49 and 49'.

The shields 63 and 63' past which the necks of the fowl first pass before entering the vertical passageway also serve as guide members to direct the necks of the fowl into said vertical passageway. It will be seen in Figure 3 that the inner edges of shields 63 and 63' converge toward the lateral boundaries of the vertical passageway which receives the neck of the fowl. The provides for automatically directing the neck of the fowl into the vertical passageway as the fowl is carried along by the overhead conveyor with its head hanging substantially directly below said overhead conveyor.

The width of the open channel 38 in the headholding means 30 may be adjusted within limits. An adjusting screw 64 is threaded in a bracket 66 fixed on the plate 46a adjacent the hood 49' at each end of the machine. The screws 64 have operable connection with the vertical portions 49b' of the hoods 49', and by adjusting the screws, the hoods 49' and the interconnecting flat portion 35 of the adjacent shield 32a can be adjusted in and out. This movement carries the respective backing plate 40a and the corresponding runs 51 and 52 of the chain toward and away from the opposite backing plate and chain so as to vary the width of the vertical passageway which receives the neck of the fowl. Although the sprocket 54' remains fixed, the sprockets 59', 61' and 62' move with the hoods 49'; but the movement of the hoods 49' is so small that the tension of the chain 50 on that side of the head-holder means is not materially affected. The distance between the runs 51 of the chains is determined by the sizes of the necks of the fowls passing through the machine. The extent of adjustment of the channel 38 need not be great, only enough to accommodate the different sizes of necks of the fowls.

Drive for the chains 50 is provided by a motor 67 at the entering end of the head holder 30 and supported one one side thereof by the hood 49. A drive pulley 68 on the motor 67 drives, by means of belt 69, a gear box 70 having a drive gear 72 which meshes with the gear 57. It will thus be seen that both chains 50 are driven by the motor 67, through meshing gears 57 and 58.

Secured to each of the plates 46, as by means of brackets 77 at each end of the head holder 30 and on each side of the center thereof is a guide frame 78. The guide frames 78 are in the form of plates disposed transversely of the machine. The brackets 77 may be secured to plates 46 in any appropriate manner, such as by welding; and the guide frames 78 are secured to the brackets 77 in any appropriate manner (not shown).

Each guide frame 78 includes a slot 80, the upper major portion of which is vertical as indicated at 82. The lower portion of each slot 80, as indicated at 84, is angled outwardly and downwardly parallel to the inclination of the shields 32 of the head holder 30. The upper and lower ends of the guide frames 78 are provided with bearing collars 86 slidably fitted on the upright members 14. The bearing collars 86 on the guide frames 78, and the collar elements 48 on the plates 46, are adapted to slide along the upright members 14 for vertical adjustment of the head-holding means 30.

A winch indicated at 90 is supported on the main frame 12 for vertical adjustment of the head-holding means 30. One flexible cable indicated at 92 leads directly from the winch 90, is trained over pulley 91, and is connected in any appropriate manner to the adjacent side of the head-holding means 30 (Figure 1); and a second flexible cable 94 leads downwardly is trained over pulley 93a, extends across the main frame, and to the opposite side of the machine, then over pulley 93b, whence it then leads upwardly, is trained over a pulley 93c and is connected to plate 46a of the head-holding means at the opposite side of the machine in any appropriate manner. Thus the central portion of the machine is kept clear for the passage of fowls therethrough. The cables 92 and 94 are secured in an appropriate manner, such as by welding, to the outer ends of plates 46 and 46a which in turn are secured on the head-holding means 30. The winch 90 is secured on a shaft 98 extending longitudinally of the machine, and on the opposite end a similar arrangement of winch and cables is provided for the opposite end of the head-holding means 30. By operation of the winches 90 the head-holding means 30 may be raised and lowered. The guide frames 78, being fixedly secured to the head-holding means 30, are raised and lowered with the head-holding means.

The picking means includes a pair of rotatable drums 100 disposed on axes positioned longitudinally of the machine. The construction of the drums 100 may be observed from Figures 7 and 8. Each drum 100 includes a shaft 102 upon which is mounted a framework 104 including a plurality of axially extending plates 106. Each plate 106 is provided with a series of notches 108. The notches 108 are V-shaped at their outer ends, and their inner ends are rounded for insertion of flexible picking fingers 110. The fingers 110 are inserted in the notches 108 and when so inserted are securely held in place therein by friction. Rotation of the drum is preferably as indicated by the arrow in Figure 8 so that the picking fingers 110 are more easily retained in the notches.

The picking fingers 110 are preferably long and flexible. When the drum is stationary, the fingers 110 are flexible enough to hang, and the outstretched position of the fingers in Figure 8 indicates rotation. The fingers 110 also preferably are provided with circumferential ribs. The representation of the drums 100 in Figures 1, 2 and 3 is semi-diagrammatic; they are shown only in the outline of the extremities of the fingers 110 when in rotation.

Each drum 100 is supported by a framework including an upright arm 112 pivoted at 114 on the lower transverse frame member 16. One such arm 112 is provided at each end of the machine for each drum. A longitudinal shaft or bar 116 is pivoted in the upper swinging ends of the respective arms 112. Rigidly secured to each end of the longitudinal shaft 116 is a second swinging arm 118. In the outer ends of the arms 118 are bearing members 120 for supporting the ends of the shaft 102 of the respective picking drum 100. Outwardly of the bearing members 120 are enlarged extensions 122 fixed to the shaft 102 and adapted to extend into and slide in the guide slots 80.

The drums 100 are adapted to be raised and lowered and be guided by the slots 80 as will be more fully explained later. The means for raising and lowering the drums 100 consist of hydraulic rams 124 having pistons or arms 124a extending therefrom. One such ram 124 is provided for each drum, and is pivoted on an arm 125 on the frame 12. The present illustration shows the rams 124 pivoted adjacent the pivot points 114 of the arms 112, but this may be varied if desired. Since the arms 118 are rigidly secured to the longitudinal member 116 they form a rigid framework, and the hydraulic ram 124 being disposed only at one end thereof is effective for raising and lowering the arms 118 at both ends. In Figure 11, the pivotal connections of arms 118 to arms 112 and longitudinal member 116 are omitted, but such connections are clearly shown in Figure 1. The ram arms 124a are pivotally connected at 127 in any appropriate manner, such as by pins, to plates 126, which are secured, as by welding to arms 118.

The framework for supporting the drums 100 is provided with appropriate reinforcing members such as vertical plates 126 secured to arms 118 and to which the extensible ram arms 124a are pivotally secured at 127, and a horizontal plate 128. A drive motor 130 is supported on the horizontal plate 128 and is operatively connected, by means of a belt 132, to the picking drum 100. One such drive motor 130 is provided for each picking drum 100. Although only one motor 130 is shown in Figure 2, a similar motor 130 is provided for the other picking drum. As the picking drum 100 is raised and lowered the drive motor 130 is carried therewith.

The raising and lowering of the picking drums 100 is effected automatically. Gear 58 is provided with downwardly extending pins 134 which on rotation of the gear 58 engage a trip lever 136 in a valve operating device 138 carried by the head-holding means 30. On one side of the machine one of the swinging arms 118 which supports the drum 100 has secured thereto, such as by welding, a plate 139 upon which is mounted a vertically adjustable pin 140 adapted to engage a trip lever 142 in a second valve operating device 144. The pins 134 are adapted to actuate the hydraulic drive so that the ram arms 124a are extended, and the pin 140 is operable to reverse the action of the hydraulic drive when the picking drums 100 reach the desired height. The height to which the drums 100 are raised can be controlled by adjusting the pin 140 to different heights.

Figure 11 shows diagrammatically one form of hydraulic mechanism for actuating the hydraulic rams 124. A pump and reservoir is indicated at 146 having leads 148 to the rams 124. As the gear 58 rotates, the pins 134 engage the trip lever 136 operating a valve which actuates the hydraulic system to extend the hydraulic rams 124. After the drums 100 reach the desired height, the pin 140 on the arm 118 engages the trip lever 142 and reverses the hydraulic drive so that the picking drums 100 descend. The particular kind of hydraulic drive does not form an essential part of the present invention, and any desired drive may be used. For example the picking drums 100 may be caused to descend in other well known manners (not shown), such as by reason of their own weight; or they may be lowered positively.

*Practical operation*

The head-holding means 30 is adjusted to an appropriate height to accommodate fowls of the particular sizes being treated. Fowls vary in size from one to the next, and of course different kinds of fowls are of different sizes. One customary type of classification, for which convenient adjustment of the machine may be made, is recognized as—little chickens, big chickens, little turkeys, and big turkeys.

Figures 1 and 4 illustrate a fowl which is small compared with the present position of adjustment of the head-holding means 30. That is, the head of the fowl is just below the inner runs 51 of the chains 50. The dotted line position of the head of the fowl in Figure 4 indicates a larger fowl, and in such a case the head depends considerably below the chains 50. As the fowls travel along the conveyor the necks pass through the vertical passageway or open channel 38 in the head-holding means. The picking drums 100 rotate in the direction indicated by the arrows in Figure 1, the picking fingers 110 sweeping upwardly over the fowls. The inner parallel runs 51 of the chains 50, which parallel runs partially bound and define said vertical passageway, are adjusted so that they do not bear heavily on the necks of the fowls, but are at such spacing that the heads of the fowls cannot move upwardly between the chains. As the picking drums sweep upwardly on the fowls they are prevented from being raised and tossed.

In the case of large fowls from which the heads depend substantially below the chains 50, the picking drums 100 in their upsweep operation carry the fowls upwardly to a point where the head engages the chains 50. Such large fowls then actually float between the head-holding means and the conveyor and the entire neck is exposed to the picking operation.

Figure 9 shows diagrammatically different positions of vertical adjustment of the head-holding means 30. It will be noted that considerable range is provided to accommodate different sizes of fowls. It will also be noted that for any one position of adjustment a considerable range is provided for different sizes of fowls, as evidenced by the space between the chains 50 and the gears 57 and 58.

In the picking operation it is desirable that the picking process is not constant but preferably intermittent. Hence the provision for raising and lowering the picking drums 100. It is also desirable that in such intermittent picking, the drums move bodily upwardly and downwardly over the fowls to provide a more thorough picking process. As the ram arms 124a are extended, the picking drums 100 are elevated and guided by slots 80. The upper portions 82 of the slots 80 are vertical as explained above, and guide the picking drums upwardly and downwardly over the fowls. As the picking drums 100 descend from the portions 82 of the slots, they are guided outwardly and downwardly by the lower portions 84 of the slots 80, so that the drums are withdrawn from the fowls and guided away from the head-holding means 30.

The objective of the means for providing intermittent picking is that the drums come into and out of engagement with the fowls. Such action in conventional pickers is accomplished by having the picking means raised and lowered along the fowls, and to come out of engagement with the fowls by continuing the downward movement beyond the lower extremities of the fowls. In the present case after the picking drums are lowered to the lower ends of the fowls they are separated, and spread away from the center of the machine to avoid striking the head-holding means.

It will be noted from Figure 1 that the extremities of the picking fingers 119 on the two drums 100 intermesh somewhat to assure that as much of the surface of the fowls as possible will be covered.

It is obvious of course that the speed of the chains 50 in the head-holding means 30 is the same as the overhead conveyor.

Cycles of movement of the picking drums in their up and down movement can be regulated so that the fowls will be subjected to the picking process several times during their travel through the machine. It has been found that two or three times is the most effective for completely picking the fowls. This number may of course be varied to suit circumstances.

While I have herein shown and described a preferred embodiment of my invention, manifestly it is susceptible of modification and rearrangement of the parts without departing from the spirit and scope thereof. I do not therefore, wish to be understood as limiting my invention to the precise form herein disclosed, except as I may be so limited by the appended claims.

I claim as my invention:

1. A head-holding means for use with a fowl picking machine of the kind wherein fowl are suspended head downward from a supporting conveyor and conveyed along a predetermined path, and picking means are provided along a portion of said predetermined path for imposing picking forces upwardly over the fowl; said head-holding means comprising a pair of vertically extending and laterally spaced apart parallel members defining a vertical passageway through which the downward hanging necks of the fowl are adapted to pass with the heads of the fowl located below said parallel members, the width of said vertical passageway being sufficient to allow the necks of the fowl to pass therethrough and less than the size of the heads of the fowl, whereby the heads of the fowl are denied passage upwardly through said vertical passageway.

2. A head-holding means for use with a fowl picking machine of the kind wherein fowl are suspended head downward from a supporting conveyor and conveyed along a predetermined path, and picking means are provided along a portion of said predetermined path for imposing picking forces upwardly over the fowl; said head-holding means comprising a pair of vertically extending and laterally spaced apart parallel members defining a vertical passageway through which the downward hanging necks of the fowl are adapted to pass with the heads of the fowl located below said parallel members, the width of said vertical passageway being sufficient to allow the necks of the fowl to pass therethrough and less than the size of the heads of the fowl, whereby the heads of the fowl are denied passage upwardly through said vertical passageway, and guide members located forwardly of said picking means and operatively associated with said parallel members to direct the neck of the fowl into said vertical passageway bounded by said parallel members.

3. A head-holding means for use with a fowl picking machine of the kind wherein fowl are suspended head downward from a supporting conveyor and conveyed along a predetermined path, and picking means are provided along a portion of said predetermined path for imposing picking forces upwardly over the fowl; said head-holding means comprising a pair of vertically extending and laterally spaced apart parallel members defining a vertical passageway through which the downward hanging necks of the fowl are adapted to pass with the heads of the fowl located below said parallel members, the width of said vertical passageway being sufficient to allow the necks of the fowl to pass therethrough and less than the size of the heads of the fowl, whereby the heads of the fowl are denied passage upwardly through said vertical passageway, a pair of guide members operatively associated with said parallel members and extending forwardly of said vertical passageway, said guide members being laterally spaced from each other to form a guide passageway registering with said vertical passageway, and the portions of said guide members bounding said guide passageway diverging as they extend forwardly from said vertical passageway, whereby the forward end of said guide passageway is of enlarged width adapted to receive and automatically guide the neck of the fowl into said vertical passageway.

4. A head-holding means for use with a fowl picking machine of the kind wherein fowl are suspended head downward from a supporting conveyor and conveyed along a predetermined path, and picking means are provided along a portion of said predetermined path for imposing picking forces upwardly over the fowl; said head-holding means comprising a pair of vertically extending and laterally spaced apart parallel members defining a vertical passageway through which the downward hanging necks of the fowl are adapted to pass with the heads of the fowl located below said parallel members, the width of said vertical passageway being sufficient to allow the necks of the fowl to pass therethrough and less than the size of the heads of the fowl, whereby the heads of the fowl are denied passage upwardly through said vertical passageway, and means operatively associated with said parallel members for varying the spacing between said spaced parallel members, whereby the width of the vertical passageway therebetween is varied.

5. A head-holding means for use with a fowl picking machine of the kind wherein fowl are suspended head downward from a supporting conveyor and conveyed along a predetermined path, and picking means are provided along a portion of said predetermined path for imposing picking forces upwardly over the fowl; said head-holding means comprising a pair of vertically extending and laterally spaced apart parallel members defining a vertical passageway through which the downward hanging necks of fowl are adapted to pass with the heads of the fowl located below said parallel members, the width of said vertical passageway being sufficient to allow the necks of the fowl to pass therethrough and less than the size of the heads of the fowl, whereby the heads of the fowl are denied passage upwardly through said vertical passageway, means operatively associated with said parallel members for varying the spacing between said spaced parallel members, whereby the width of the vertical passageway therebetween is varied, and guide members operatively associated with said parallel members and located forwardly of said picking means and in alignment with said vertical passageway adapted to guide the necks of the fowl into said vertical passageway.

6. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, continuous elements, said continuous elements having opposed parallel runs defining a vertical passageway through which the downward hanging necks of fowl are adapted to pass with the heads of the fowl located below said parallel runs of the continuous elements, the width of said vertical passageway being sufficient to allow the necks of the fowl to pass therethrough and less than the size of the heads of the fowl, whereby the heads of the fowl are denied passage upwardly through said vertical passageway.

7. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, flexible and continuous elements, said continuous elements having opposed parallel runs defining a vertical passageway through which the downward hanging necks of fowl are adapted to pass with the heads of the fowl located below said parallel runs of the continuous elements, the width of said vertical passageway being sufficient to allow the necks of the fowl to pass therethrough and less than the size of the heads of the fowl, whereby the heads of the fowl are denied passage upwardly through said vertical passageway, and support members positioned beneath and operatively associated with said parallel runs to support the portions of the continuous elements passing thereover.

8. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, flexible and continuous elements, said continuous elements having opposed parallel runs defining a vertical passageway through which the downward hanging necks of fowl are adapted to pass with the heads of the fowl located below said parallel runs, the width of said vertical passageway being sufficient to allow the necks of the fowl to pass therethrough and less than the size of the heads of the fowl, whereby the heads of the fowl are denied passage upwardly through said vertical passageway, and backing members positioned behind and operatively associated with said parallel runs to limit the outward lateral movement of the portions of the continuous elements passing adjacent thereto.

9. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, flexible and continuous elements, said continuous elements having opposed parallel runs defining a vertical passageway through which the downward hanging necks of the fowl are adapted to pass with the heads of the fowl located below said parallel runs, the width of said vertical passageway being sufficient to allow the necks of the fowl to pass therethrough and less than the size of the heads of the fowl, whereby the heads of the fowl are denied passage upwardly through said vertical passageway, backing members positioned behind said parallel runs to limit the outward lateral movement of the portions of the continuous elements passing adjacent thereto, and means operatively associated with said backing members for varying the spacing between said backing members and between said parallel runs, whereby the width of the vertical passageway therebetween is varied.

10. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, continuous elements, said continuous elements having opposed parallel runs defining a vertical passageway through which the downward hanging necks of fowls are adapted to pass with the heads of the fowl located below said parallel runs, the width of said vertical passageway being sufficient to allow the necks of the fowl to pass therethrough and less than the size of the heads of the fowl, whereby the heads of the fowl are denied passage upwardly through said vertical passageway, and each said moving, continuous element having spaced projections thereon extending into said vertical passageway toward the opposite continuous element, said projections being adapted to operatively engage the necks of the fowl during the conveyance thereof.

11. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, continuous elements, said continuous elements having opposed parallel runs defining a vertical passageway through which the downward hanging necks of fowl are adapted to pass with the heads of the fowl located below said parallel runs, the width of said vertical passageway being sufficient to allow the necks of the fowl to pass therethrough and less than the size of the heads of the fowls, whereby the heads of the fowl are denied passage upwardly through said vertical passageway, each said moving, continuous element having spaced projections thereon extending into said vertical passageway toward the opposite continuous element, said projections being adapted to operatively engage the necks of the fowl during the conveyance thereof, and said spaced projections on one continuous element being staggered with respect to the spaced projections on the opposite continuous element.

12. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, continuous elements, said continuous elements having opposed parallel runs defining a vertical passageway through which the downward hanging necks of fowl are adapted to pass with the heads of the fowl located below said parallel runs, the width of said vertical passageway being sufficient to allow the necks of the fowl to pass therethrough and less than the size of the heads of the fowl, whereby the heads of the fowl are denied passage upwardly through said vertical passageway, and each of said moving, continuous elements being formed of a plurality of segments having enlargements at the end thereof linked together, said enlargements forming spaced projections which extend into said vertical passageway and are adapted to operatively engage the necks of the fowl during the conveyance thereof.

13. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, continuous chains, said continuous chains having opposed parallel runs defining a vertical passageway through which the downward hanging necks of fowl are adapted to pas with the heads of the fowl located below said parallel runs, the width of said vertical passageway being sufficient to allow the necks of the fowl to pass therethrough and less than the size of the heads of the fowl, whereby the heads of the fowl are denied passage upwardly through said vertical passageway, and each of said chains being composed of a plurality of links linked together at their ends and forming enlargements at the points of linkage which project into said vertical passageway, said projections being adapted to operatively engage the necks of the fowl during the conveyance thereof.

14. A head-holding means for use with a fowl picking machine of the kind wherein fowl are suspended head downward from a supporting conveyor and conveyed along a predetermined path, and picking means are provided for imposing picking forces upwardly over the fowl; said head-holding and conveying means comprising a pair of moving, laterally spaced, flexible and continuous elements, said continuous elements having opposed parallel runs defining a vertical passageway through which the downward hanging necks of fowl are adapted to pass with the heads of the fowl located below said parallel runs, the width of said vertical passageway being sufficient to allow the necks of the fowl to pass therethrough and less than the size of the heads of the fowl, whereby the heads of the fowl are denied passage upwardly through said vertical passageway, support members positioned beneath said parallel runs to support the portions of the continuous elements passing thereover, and backing members positioned behind said parallel runs to limit the outward lateral movement of the portions of the continuous elements passing adjacent thereto.

References Cited in the file of this patent

UNITED STATES PATENTS

| Number | Name | Date |
|---|---|---|
| 1,948,975 | Urschel | Feb. 27, 1934 |
| 2,469,345 | Toti et al. | May 3, 1949 |